Figure 2:
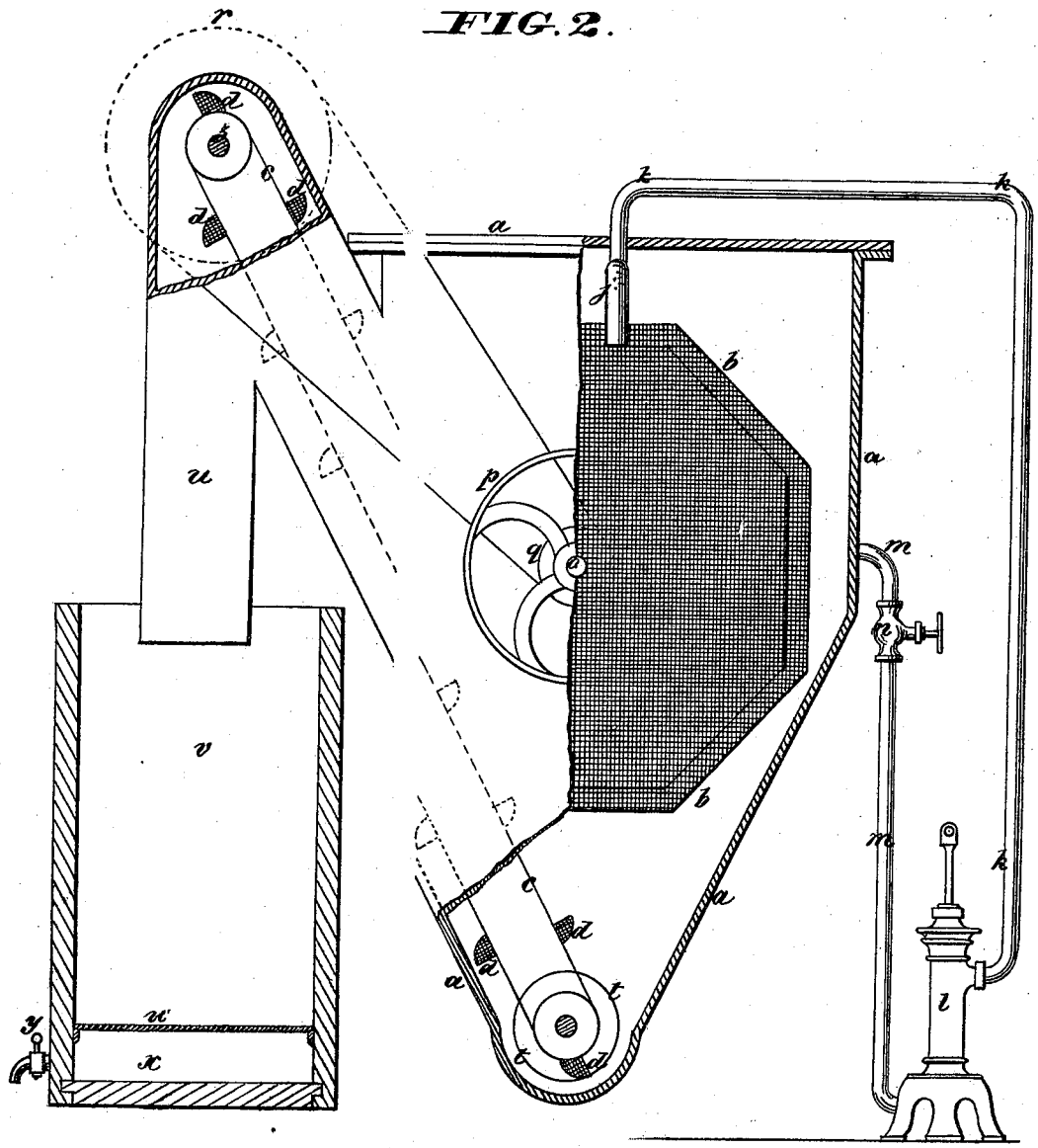

2 Sheets—Sheet 1.
D. W. RIDDLE.
FILTER.
No. 184,427. Patented Nov. 14, 1876.
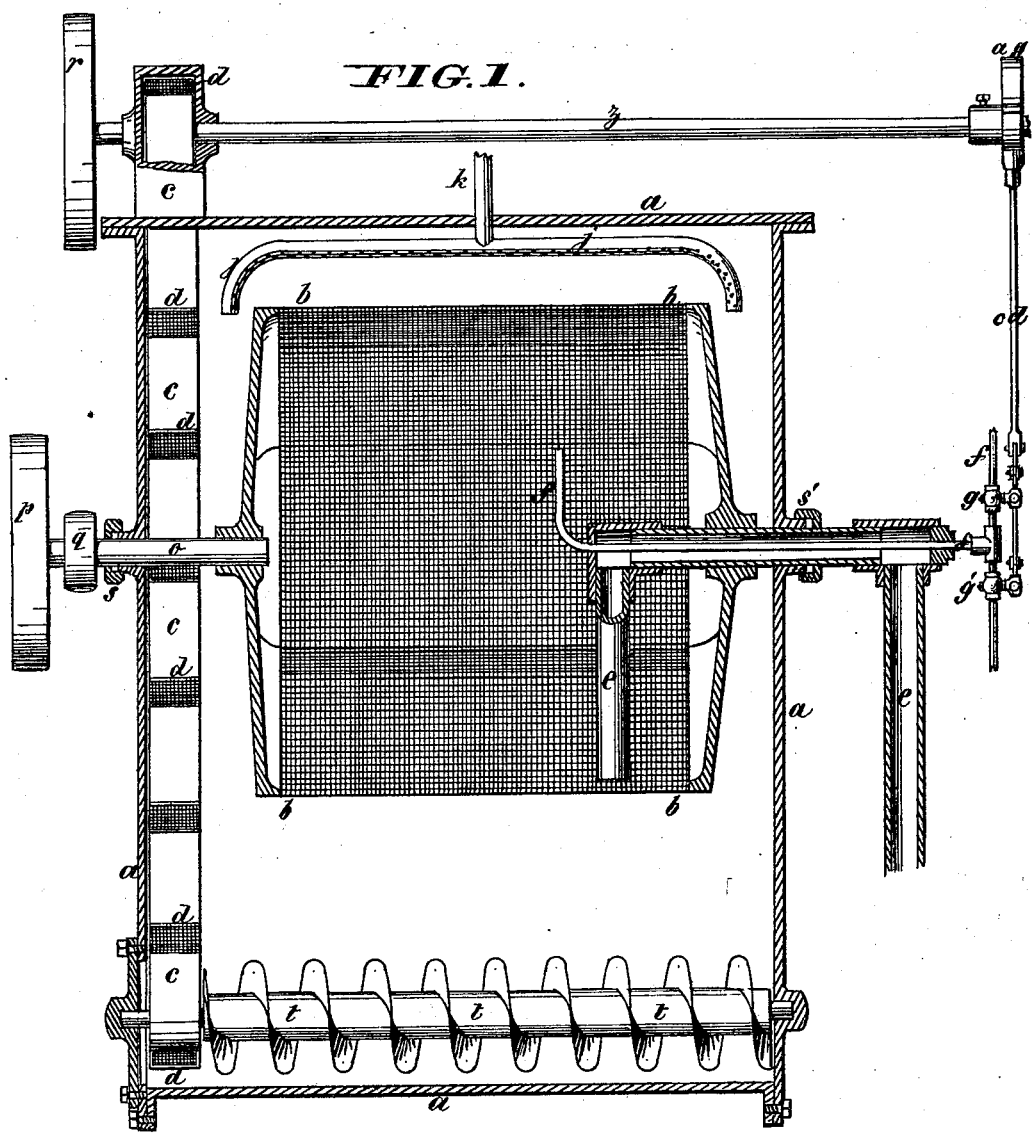
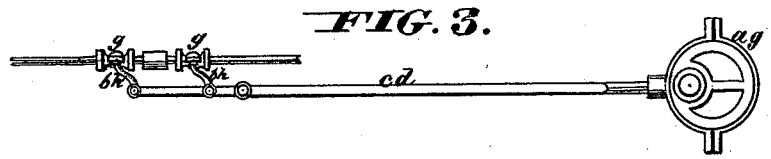
WITNESSES
Chas J Gooch
Le Blond Burdett
INVENTOR
Daniel W Riddle
By Knight Bro Attorneys.

UNITED STATES PATENT OFFICE.

DANIEL W. RIDDLE, OF WATERLOO, NEW YORK.

IMPROVEMENT IN FILTERS.

Specification forming part of Letters Patent No. 184,427, dated November 14, 1876; application filed December 29, 1875.

*To all whom it may concern:*

Be it known that I, DANIEL W. RIDDLE, of Waterloo, Seneca county, State of New York, have invented a new and useful Method and Apparatus for Filtering Fluids and Semi-Fluids, of which the following is a specification:

The object of my invention is to furnish an apparatus by which liquids can be filtered more rapidly and economically than has heretofore been done, and the filter be kept automatically constantly clear and free from clogging by the accumulation of solid deposit.

Figure 1 is a longitudinal section of my improved apparatus. Fig. 2 is an end elevation and transverse section of the same. Fig. 3 is a detailed view of arrangement for working automatic valves which control pressure in the filter.

A represents a box, case, or tank inclosing the polygonal revolving filter $b$, the screw-conveyer $t$, and draining-elevator $c$, fitted with perforated buckets $d$, the perforated or slotted pipe $j$, and part of the siphon-shaped pipe $e$. The filter $b$ is revolved by power applied to the pulley $p$ on the shaft $o$, the conveyer $t$, and elevator $c$, by a belt from the pulley $q$ on the shaft $o$ to the pulley $r$ on the shaft $z$. The filter $b$ is a skeleton frame, whose periphery and ends are covered with wire cloth, felt, or any filtering material or materials suitable to the liquid to be filtered, and it is supported in the box $a$ at one end by the shaft $o$, which works in the stuffing-box $s$. The other end or hub turns on the horizontal part of the siphon-shaped pipe $e$. The siphon $e$ enters the box $a$ through the stuffing-box $s'$, and the short leg passes nearly to the bottom of the interior of the filter $b$. The longer leg passes into a receptacle for the filtered liquid. The pipe $f$, connecting with the valves $g$ and $g'$, passes through the horizontal portion of the siphon-shaped pipe $e$, and turns into the upper interior part of the filter $b$. The valves $g$ $g'$ are situated in the pipe $ff$, and are worked by the eccentric $a g$ on the shaft $z$. The pump $l$ in Fig. 2 is connected with the box $a$ by the suction-pipe $m$. The discharge-pipe $k$ communicates with the perforated pipe $j$ in the upper part of the box $a$. The tank $v$ in Fig. 2 has a perforated false bottom, and is situated under the spout $u$ from the elevator $c$.

Operation: The liquid to be filtered is supplied from a store-tank to the tank $a$, which is kept filled to a point above the suction-pipe $m$ wherever located. The filter $b$ revolves slowly, with part of its surface above the liquid-line in the tank $a$. The action of the pump $l$ causes a stream of the liquid, the volume of which is regulated by the cock $n$, to pass from the tank $a$, through the pipes $m$ and $k$ and the perforated pipe $j$, onto the upper surface of the revolving filter, which is cleaned by the wash. The filterable liquid penetrates to the interior of the filter by the pressure of the exterior bath and the force of the wash. The solid deposit detained on the filtering-surface is constantly disturbed by the wash, and is deposited in the conveyer $c$, if heavy enough to sink in the bath, or, in case of its floating, is taken up by the perforated buckets $d$ on the elevator-belt $c$. The action of the wash is assisted by a steam or vapor pressure from the interior of the filter, which forces the solid deposit off from the extreme surface of the filter; also drives from out of the interstices of the filtering material or materials all minute solid particles, and the operation of which is hereafter described. The sediment of filtration deposited on the conveyer $t$ is carried off by it and by the draining perforated elevator $c$, and the drained solid is discharged through the spout $u$ into the tank $v$, where it is further drained through the perforated false bottom $w$, and the drained liquid falling into the space $x$ is drawn off through the cock $y$. The filtrate is removed from the interior of the filter $b$ by the siphon-shaped pipe $e$, which can either be used as a siphon or attached to a pump. When used as a siphon, it is operated by an alternately creating and relieving pressure in the interior of the filter $b$. This is done by means of the alternate and automatic action of the valves $g$ $g'$, which are opened and shut by the motion of the pitman $c$ $d$ connecting them with the eccentric $a$ $g$. When $g$ is open and $g'$ closed, a pressure of steam, air, or vapor enters the interior of the filter through the pipe $f$, which, besides throwing off solid deposit from the exterior, forces liquid from the interior into the pipe $e$, and causes the siphon to act. When $g'$ is open and $g$ closed, an equilibrium is established in the filter, and air allowed to enter. By the same means the liquid in the interior of the filter is left lower than that on the exterior, and filtration is accelerated by the greater pressure on the outside. When the nature of the filterable liquid admits, steam-pressure is used; when otherwise, the pressure of air or of any suitable gas or vapor is employed.

In liquids requiring heat for filtration a heating appliance is introduced into the tank $a$, in the space between the lower side of the filter $b$ and the conveyer $t$.

I do not confine myself to any particular mechanical construction of the filter or attachments; but claim as new and desire to secure by Letters Patent—

1. The process herein described for cleaning a filter by means of showering or pouring on the exposed surface of the filter liquid or material to be filtered, substantially in the manner and for the purpose set forth.

2. The process of cleaning a filter by the combined action of liquid showered or poured on the surface, and steam, air, gas, or vapor introduced intermittently within the filtering-cylinder.

3. The combination, with the revolving filter, of a siphon, pump, or other exhaust pipe, $e$, for carrying off the filtered liquid and maintaining a lower pressure on the inside than on the outside of the filter, to assist the filtration of the liquid.

4. The combination, with the tank $a$ and filter $b$, of the conveyer $t$, elevating-belt $c$, and perforated buckets $d$.

5. The combination of the tank $a$, revolving filter $b$, perforated wash-pipe $j$, air and steam pipe $f$, and siphon $e$, as and for the purpose set forth.

6. The combination, with the revolving filter $b$, of the valves $g$ $g'$, adapted to alternately introduce steam and air, in the manner set forth.

DANIEL W. RIDDLE.

Witnesses:
M. MOORE,
CHARLES A. KNOX